No. 771,955. PATENTED OCT. 11, 1904.
L. O. WATSON.
GAS STOVE.
APPLICATION FILED NOV. 2, 1903.
NO MODEL.
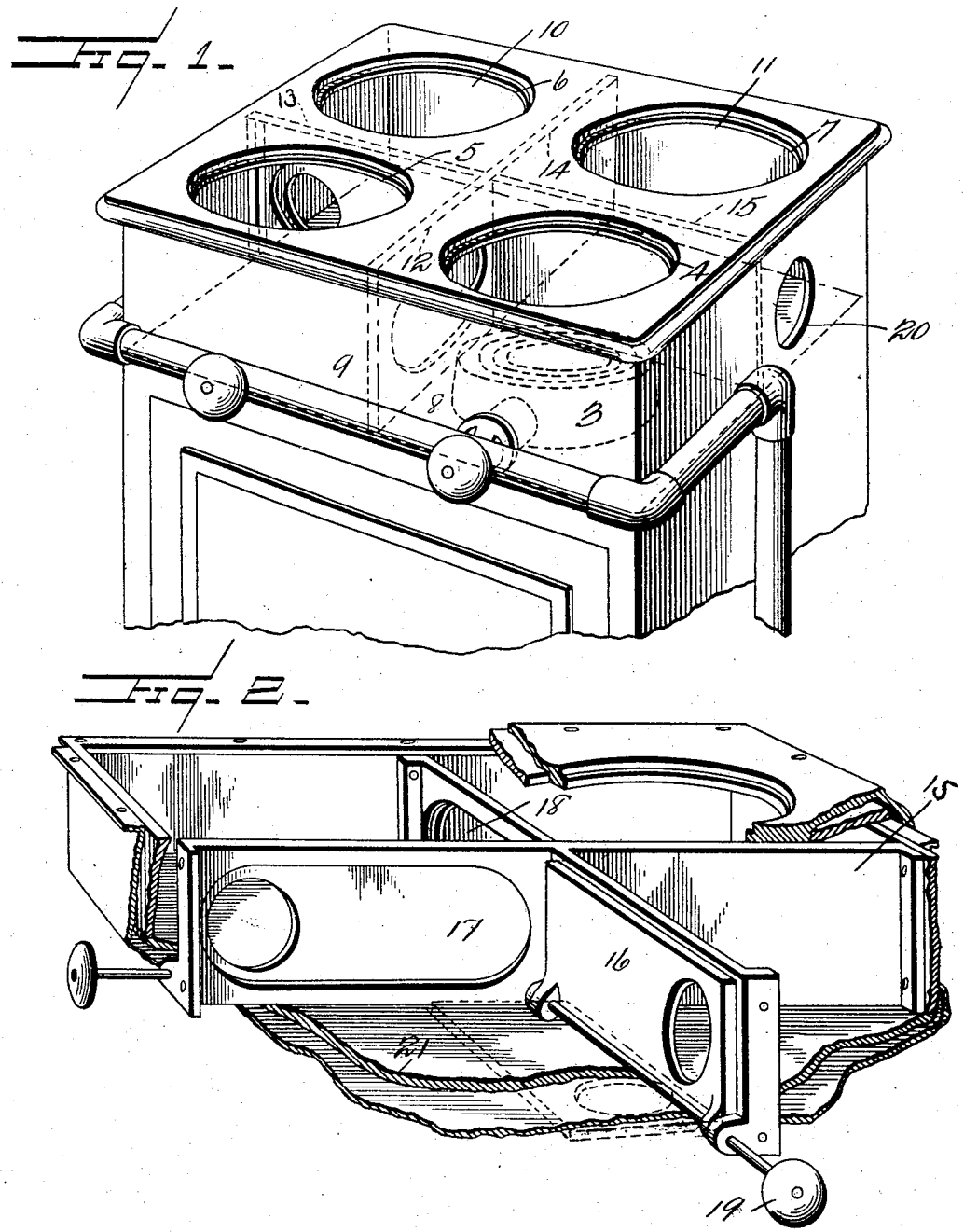
WITNESSES:
INVENTOR
Lewis O. Watson.
BY
Attorneys No. 771,955. Patented October 11, 1904.

UNITED STATES PATENT OFFICE.

LEWIS O. WATSON, OF ST. LOUIS, MISSOURI, ASSIGNOR OF ONE-HALF TO FRANCIS P. RUSSELL, OF ST. LOUIS, MISSOURI.

GAS-STOVE.

SPECIFICATION forming part of Letters Patent No. 771,955, dated October 11, 1904.

Application filed November 2, 1903. Serial No. 179,527. (No model.)

*To all whom it may concern:*

Be it known that I, LEWIS O. WATSON, a citizen of the United States, residing at St. Louis, State of Missouri, have invented certain new and useful Improvements in Gas-Stoves, of which the following is a specification containing a full, clear, and exact description, reference being had to the accompanying drawings, forming a part hereof.

My invention relates to improvements in gas-stoves, and has for its object to effect the conservation of the heat developed by the burners employed at the top of a gas-stove.

My improved gas-stove comprises an imperforate bottom, imperforate walls extending upwardly around the edge of said bottom and forming a heat-chamber, partition-walls dividing said heat-chamber into heat-compartments, there being passages through said partitions to connect said heat-compartments in series, valves for controlling said passages, a top closing said heat-compartments, there being an opening in said top for each heat-compartment to receive cooking utensils, and a burner in the first heat-compartment of the series, there being means of leading the products of combustion from the last heat-compartment of the series.

In the drawings, Figure 1 is a perspective view of the upper portion of a gas-stove embodying my invention. Fig. 2 is a perspective view of the upper portion of a gas-stove embodying my invention, showing portions of the outer walls broken away.

My invention is intended for use in gas-stoves having two or more holes.

Heretofore gas-stoves have been constructed having open tops with a number of burners arranged therein, such burners being adapted to heat vessels immediately above them, no provision being made to utilize the surplus heat by lateral distribution.

It is the primary object of my invention to provide a gas-stove having a solid top and such top having a plurality of holes, all of said holes being adapted to contain vessels to be heated from a single burner or from a number of burners less than the total number of holes.

In the embodiment of my invention illustrated in the drawings I have shown a four-hole gas-stove, all of the openings in the top thereof being adapted to receive their heat from a single burner, said burner being shown in dotted lines in Fig. 1 and indicated by the numeral 3.

The holes are indicated by the numerals 4, 5, 6, and 7, respectively, the hole numbered 4 being immediately above the burner 3. The top of the stove shown in the drawings is divided by vertical walls into the compartments 8, 9, 10, and 11, the walls being indicated by the numerals 12, 13, 14, and 15. The wall 15 is imperforate, while the walls 12, 13, and 14 are provided with perforated dampers 16, 17, and 18.

The heat arising from the burner 3 is utilized primarily to heat the vessel placed over the hole 4. The surplus heat and other products of combustion then find egress to the compartment 9 through the opening in the wall 12, the passage of the heat and other products of combustion being controlled by the damper 16, which is actuated by the knob 19 or in any other suitable manner. The heat thus entering the compartment 9 is utilized to heat a vessel or vessels placed upon the hole 5. The heat and other products of combustion are then admitted to the compartment 10 through the opening in the wall 13, their passage being controlled by the damper 17. The heat thus admitted to the compartment 10 is utilized to heat vessels placed over the hole 6. The heat and other products of combustion are then admitted to the compartment 11 through the opening in the wall 14 to heat vessels placed upon the hole 11, the products of combustion finally finding egress from the stove through the flue-opening 20.

It is obvious that the gas-stove of my invention may be of any desired size and provided with any desired number of holes and that the heat-supply may be reinforced at any desired point during the circulation of the heat-current beneath the holes. Thus if a high degree of heat were desired in the compartments 10 and 11 an additional burner could be inserted in the compartment 10, and upon the same principle any desired degree of heat might be maintained in any desired number of compartments.

In order to assist in the conservation of heat generated by the burner 3, the outer sides, tops, and bottoms of the compartments 8, 9, 10, and 11 are provided with a lining of non-conducting material, (indicated by the numeral 21,) which may be constructed from asbestos or any other desired substance. The compartments 9, 10, and 11, which are not occupied by burners, may be utilized as warming-closets or may be provided with water-coils for the further utilization of the heat, if desired.

Having thus described my invention, what I claim as new, and desire to have secured to me by the grant of Letters Patent, is—

A gas-stove comprising, an imperforate bottom; imperforate walls extending upwardly around the edge of said bottom and forming a heat-chamber; partition-walls dividing said heat-chamber into heat-compartments; there being passages through said partitions to connect said heat-compartments in series; valves for controlling said passages; a top closing said heat-compartments, there being an opening in said top for each heat-compartment to receive cooking utensils; and a burner in the first heat-compartment of the series; there being means of leading the products of combustion from the last heat-compartment of the series.

In testimony whereof I have signed my name to this specification in presence of two subscribing witnesses.

LEWIS O. WATSON.

Witnesses:
M. G. IRION,
JAMES L. HOPKINS.